Patented Feb. 13, 1923.

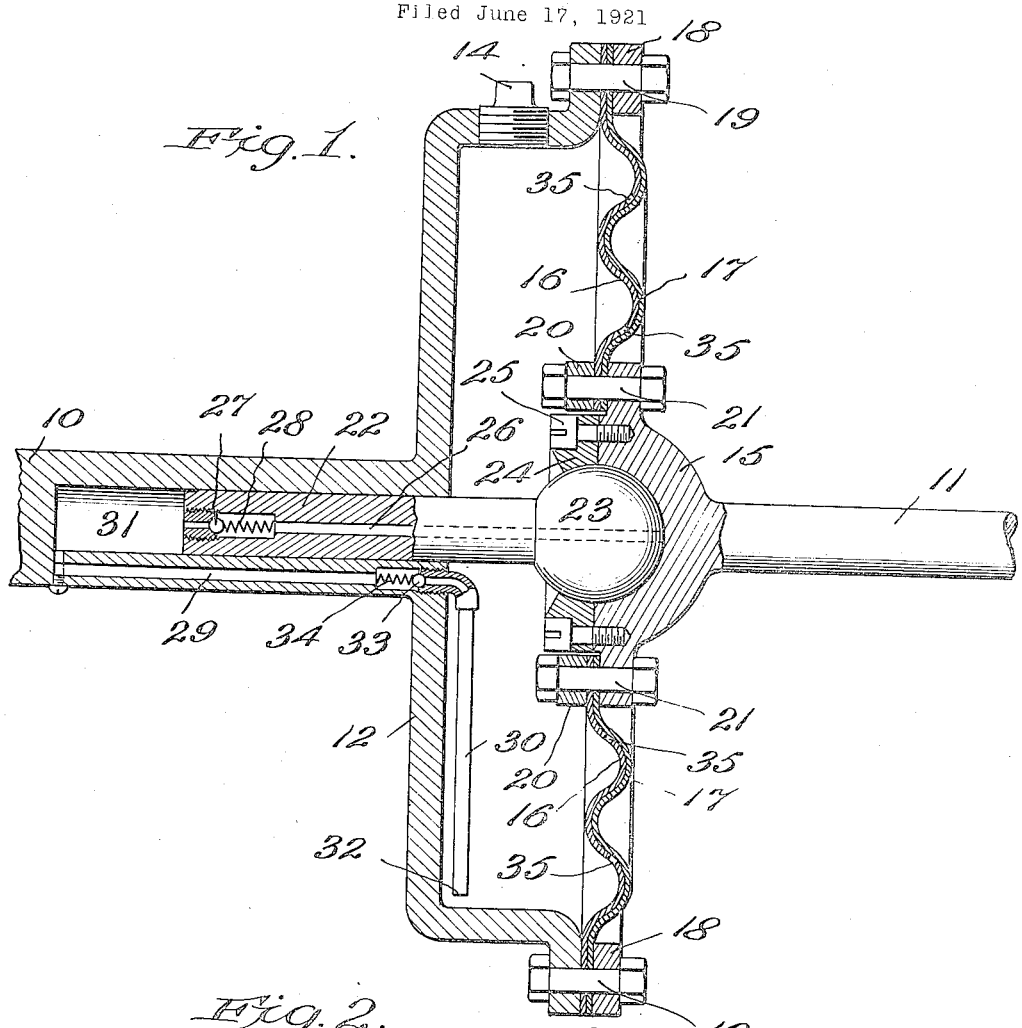

1,445,272

UNITED STATES PATENT OFFICE.

EDWIN R. GILL, OF YONKERS, NEW YORK.

UNIVERSAL JOINT FOR POWER TRANSMISSION.

Application filed June 17, 1921. Serial No. 478,403.

*To all whom it may concern:*

Be it known that I, EDWIN R. GILL, a citizen of the United States, residing in Yonkers, Westchester County, the State of New York, have invented a certain Improvement in Universal Joints for Power Transmissions, of which the following is a specification.

My present invention has relation to an important improvement in universal joints for transmitting power between rotating shafts in a manner to accommodate relative longitudinal or angular displacement, or both; and more particularly to cases in which the conditions of operation involve frequent changes in the angle between the shafts, with changes in the total length of the joint. My invention is applicable in many connections; but, since all of its advantages are fully displayed in drives for automobiles, I shall discuss those advantages in that special connection, but without intending to limit my invention to automobile practice.

The actual efficiency of an automobile is expressible in terms of the distance covered per gallon of gasoline (or other fuel) used. Practice has shown that the loss of power in motor cars is due only in a small degree to defects in motor design. By far the greater proportion of energy loss takes place in the mechanism whereby the engine torque is transmitted to the driving wheels.

As the motor is carried upon the body, so as to permit the spring suspension to preserve it from shocks, it follows that the power transmitting means must include joints capable of accommodating the changes in relative position which occur constantly between the chassis and the driving wheels, due to both vertical and horizontal yielding of the springs. It is in these joints that a very large proportion of the power losses have hitherto taken place.

In substantially all types of motor cars a universal joint is used at each end of the connecting shaft whereby the power is transmitted from the engine shaft to the differential on the rear—or driving—axle. In some types of cars there is a third universal joint between the clutch and the transmission.

One principal disadvantage in the joints commonly used in this connection is the loss of power incident to slipping and consequent friction between relatively moving parts through which the effort is actually transmitted. This occurs partly at the cross pins in the commonly used knuckle joint, but the greatest loss is probably due to the constant movement of the spline in the connecting shaft. Since the entire power is transmitted by pressure upon this element, which cannot be adequately lubricated without great difficulty, it is clear that the inevitable slippage at this point involves material waste of power.

Perhaps an equally great disadvantage is found in the fact that the slipping of the various parts which transmit effort causes great wear, with consequent rapid deterioration. The parts work loose producing very detrimental "backlash" and vibration including a wobbling of the propeller shaft which gets out of line. Those vibrations are transmitted to the body with detriment to the machine parts, and also to the axles, shortening the life of the tires. The discomfort and annoyance to passengers resulting from such vibration is also serious.

The wear resulting from the above causes also works loose the nuts and bolts. Those are not easily accessible, and are therefore apt to be neglected by the chauffeur, with the result of a sudden and often highly inconvenient breakdown.

My present invention entirely avoids all of the above objections, because it transmits the driving effort through a resilient member rigidly fixed to the contiguous members of the universal joint.

In its preferred form my improved transmitting members forms one side of a closed casing, so related to the various parts as to afford means for lubricating the same by charging with oil once for all, without making necessary any attention for a long space of time.

The slipping parts of my improved joint serve only to preserve true alinement of the propeller shaft while permitting longitudinal play, and these parts do not transmit any of the driving effort. The casing affords a hermetic seal for the lubricant, preventing leakage and admission of dust; and my invention covers the use of this expedient whatever the nature of the enclosed mechanism.

In addition to these, my improvement has the following advantages. It is cheaper to build than ordinary joints, since the parts are few in number and require only standard lathe work and stamping. It is also more easily and readily put together and applied. The resilient transmission cushions the motor and differential, and these resilient parts are always in static and running balance. The joint will last indefinitely because of absence of wear, and the propeller shaft will never get out of line.

One form of the invention is illustrated in the accompanying drawing in which Figure 1 shows the essential and other features of the joint in median section, as attached to a driving and a driven shaft, and Figure 2 is a similar view of one half of a modified form.

The two shafts are shown respectively at 10 and 11. Either of these may be used to drive the other without departing from the invention.

The essential point of the invention is that power is transmitted from one shaft to the other through a corrugated spring plate, preferably composite in nature and preferably enclosing one side of a lubricant chamber.

In the specific form shown this is accomplished as follows: The shaft 10 is furnished with a circular face-plate 12, which may or may not be integral with the shaft. The edge of this plate has a cylindrical extension 13, surrounding the lubricant chamber, and the opening for charging this chamber with oil is closed by a threaded plug 14.

On the end of the shaft 11 is a hub 15, and this hub is jointed to the annular edge of the cylinder 13 by an annular, corrugated spring-plate preferably composed of a plurality of laminæ 16 and 17, on the general principle of the laminated springs used to support vehicles. The outer edge of this plate is fixed to the cylinder 13 by being firmly clamped between the edge of the cylinder and a ring 18, by bolts 19; while a smaller ring 20 and bolts 21 fasten the central part of the composite plate to the hub 15.

While the structure thus far described will be sufficient for some purposes and is within the scope of my broader claims, I prefer to supplement it with certain parts to insure perfect alinement and to promote circulation of oil and efficiency of lubrication.

For this purpose the end of the shaft 10 is made hollow to receive a snugly fitting aligning rod 22, whose opposite end has a ball 23, fitting a socket in the hub 15. The ball and socket joint is completed by the closing ring 24, held by bolts 25.

In addition to its aligning function, the rod is made to act as the active member of an oil-circulating system. For this purpose it is bored longitudinally as shown at 26, and is fitted with an inwardly opening ball valve 27, held to its seat by a spring 28. A passage 29, 30, located in any convenient manner, leads from the space 31 behind the rod 22, to a point 32 close to the inner periphery of the cylinder 13. At a convenient point between 31 and 32, the passage is provided with an inwardly opening ball valve 33 held to its seat by a spring 34.

When the joint is in action, its revolution will throw the oil outward by centrifugal force, until its inner surface takes some such position as is indicated by the dotted lines in the drawing, and the opening 32 should be under the surface of the oil under these conditions.

It is clear that, as the rod 22 reciprocates rapidly within the hollow in the shaft 10 (as it will when the joint is in action) it will act as a pump, drawing oil from its centrifugal position in through the bore 26, to cover the head of the ball 23, thence returning to the center of the oil chamber to be again thrown to the periphery.

In order that the laminæ composing the transmission plate 16, 17, may be free to slip over each other as they bend, without appreciable friction, it is necessary that lubricating oil be introduced between these laminæ. For this purpose all the laminæ except the outermost one are provided with perforations at different distances from the center, as indicated at 35. The oil will enter the holes nearer the center and move outward by centrifugal force, returning to the oil chamber through openings further from the center.

While it is within the broader invention to use a single corrugated plate, the laminated form will be necessary for the transmission of large torque, while preserving a proper flexibility.

In Figure 2 is shown a modified form, in which the torque-transmitting plates are supplemented by additional spring plates of successively lessening diameter, and all fixed at the center. The advantages of the well-known compound leaf spring construction are thereby attained.

These may be applied either inside, as at 36 (and these are preferably perforated for better lubrication as shown) or on the outside, as at 37. If desired they may be applied on both sides of the plates 16, 17, as illustrated in Figure 2.

What I claim is—

1. In a universal joint, a driving rotary member and a driven rotary member, in combination with a substantially circular, corrugated resilient transmission plate composed of successive laminæ in a manner to form a closed chamber, and means for introducing lubricant into said chamber and for conveying the same in between said laminæ.

2. Apparatus as in claim 1 wherein the transmission plate is composed of successive laminæ, all but the outer member of which are perforated at intervals.

3. Apparatus as in claim 1 wherein means are provided for returning toward the center the oil thrown out centrifugally within the lubricant chamber.

4. Apparatus as in claim 1 wherein is provided an aligning rod having a bore containing a valve, said rod being adapted to reciprocate within a hollow in one rotary member, and wherein a valve-provided passage leads from said hollow to a point near the periphery of the lubricant chamber.

In testimony whereof I have hereto set my hand on this 14th day of June, 1921.

EDWIN R. GILL.